United States Patent [19]

Francis, Jr. et al.

[11] Patent Number: 5,124,132
[45] Date of Patent: Jun. 23, 1992

[54] CORONA DISCHARGE OZONE GENERATOR

[75] Inventors: Ralph M. Francis, Jr.; John C. Mastopietro, both of Racine, Wis.

[73] Assignee: Plasma Technics, Inc., Racine, Wis.

[21] Appl. No.: 718,048

[22] Filed: Jun. 20, 1991

[51] Int. Cl.[5] .......................... B01J 19/08; B01J 19/12
[52] U.S. Cl. ........................ 422/186.07; 422/186.03; 204/180.6
[58] Field of Search .............. 422/186, 186.04, 186.07, 422/186.3, 907; 204/180.6

[56] References Cited

U.S. PATENT DOCUMENTS

| | | | |
|---|---|---|---|
| 1,454,219 | 5/1923 | Goedicke | 422/186.18 |
| 3,421,999 | 1/1969 | Corwin | 204/314 |
| 3,739,440 | 6/1973 | Lund et al. | 29/25.13 |
| 3,766,051 | 10/1973 | Bollyky | 204/321 |
| 3,942,020 | 3/1976 | Clambrone | 250/539 |
| 4,035,657 | 7/1977 | Carlson | 250/533 |
| 4,141,830 | 2/1979 | Last | 210/63 Z |
| 4,179,616 | 12/1979 | Coviello et al. | 250/527 |
| 4,417,966 | 11/1983 | Krauss et al. | 204/176 |
| 4,504,446 | 3/1985 | Kunicki | 422/186.19 |
| 4,694,179 | 9/1987 | Lew et al. | 250/431 |
| 4,725,412 | 2/1988 | Ito | 422/186.19 |
| 4,764,349 | 8/1988 | Arff et al. | 422/186.18 |
| 4,774,062 | 9/1988 | Heinemann | 422/186.19 |
| 4,963,331 | 10/1990 | Mouw | 422/186.18 |
| 5,019,256 | 5/1991 | Ifill et al. | 210/232 |

FOREIGN PATENT DOCUMENTS

| | | |
|---|---|---|
| 2748912 | 5/1979 | Fed. Rep. of Germany .................. 422/186.18 |
| 235741 | 1/1969 | U.S.S.R. .......................... 422/186.18 |

Primary Examiner—Brooks H. Hunt
Assistant Examiner—Daniel J. Jenkins
Attorney, Agent, or Firm—Quarles & Brady

[57] ABSTRACT

A non-perforated metal tube with open opposite ends extends coaxially around a plasma discharge tube that projects beyond both ends of the metal tube. The plasma tube contains an ionizable gas and an electrode. The ends of both tubes engage two end cap assemblies which maintain the tubes in a coaxial, uniformly spaced relationship. Both end cap assemblies have a tubular coupling that fits around a flared end of the metal tube and have a mechanism for supporting the glass tube. Passages are provided in the end cap assemblies for gas to enter and exit. A plasma is established in the plasma discharge tube by applying an excitation potential between the electrode and the metal tube.

12 Claims, 1 Drawing Sheet

CORONA DISCHARGE OZONE GENERATOR

BACKGROUND OF THE INVENTION

The present invention relates to apparatus for generating ozone; and more particularly to such apparatus that use a corona to produce the ozone.

A previous ozone generator shown in U.S. Pat. No. 4,764,349, utilized a sealed glass tube that was filled with a gas. An electrical conductor rod passed through the glass tube at one end and extended the entire length of the tube. A perforated, fluted metal grid surrounded the tube so that when a high voltage is applied across the rod and the grid, a corona is developed between the glass tube and the grid. Oxygen passing through the corona is ionized to produce ozone, which is useful in treating air or water, for example.

Glass tubes with internal rods for this type of generator are not only costly to manufacture, but sensitive to leaks from a failure of the glass to metal bond induced by vibrations. Furthermore, the grid must be uniformly spaced from the glass tube. Otherwise, an intense corona is produced at the narrowest spacing ultimately leading to the breakdown of the glass and failure of the generator. In addition, very sharp points on either the glass or the grid can cause arcing, which also results in premature failure of the generator.

SUMMARY OF THE INVENTION

An ozone generator has a generally tubular design in which a plasma discharge tube having a glass envelope is placed coaxially within a non-perforated metal tube. The metal tube preferably has flared ends to reduce arcing between sharp edges at those ends and the glass envelope. An end portion of the metal tube fits within a non-conductive first tubular member containing a non-conductive annular seal that receives the glass tube. Another tubular member engages the other end of the metal tube and has a non-conductive washer that receives the glass tube. The engagement of both tubes with the assemblies at each end maintains the tubes in a uniform coaxial relationship.

One tubular member has an aperture through which oxygen can enter a gap formed between the glass and metal tubes. The other tubular member includes a passage through which ozone enriched gas exits the generator. Preferably a connection means is provided for coupling to a collection system for the ozone enriched gas.

A general object of the present invention is to provide a durable, economical and efficient means to generate ozone.

Another object of the present invention is to utilize a gas plasma as a conductor in an ozone generator, instead of a conductive rod through a glass tube.

A further object of the present invention is to provide a structure which minimizes the likelihood of intense destructive corona discharges occurring between the conductors of the generator.

DETAILED DESCRIPTION OF THE INVENTION

Figure 1:
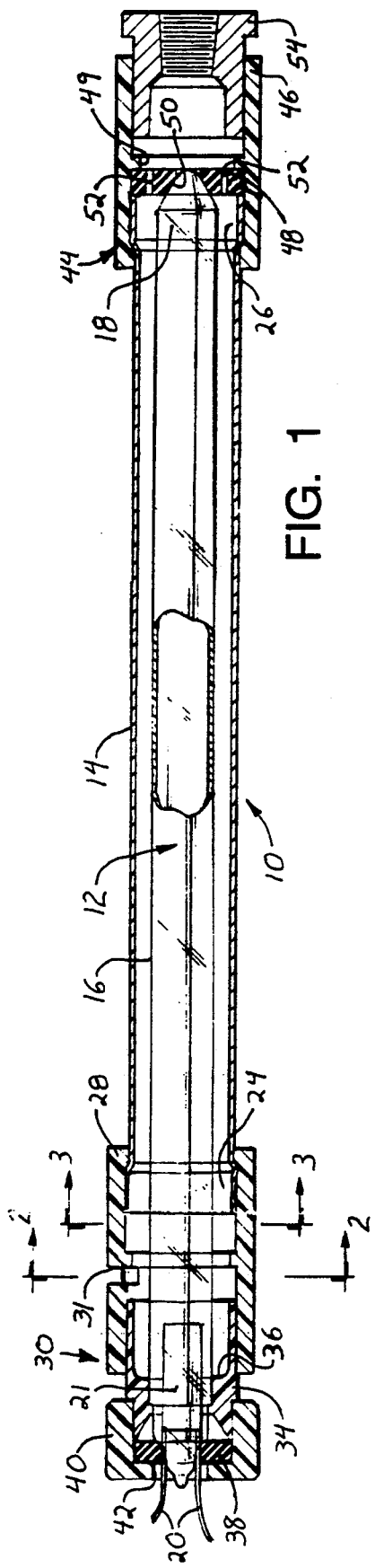
FIG. 1 is a cross section longitudinally through an ozone generator which incorporates the present invention.

With reference to FIG. 1, an ozone generator 10 includes a conventional gas plasma discharge tube 12 and an open ended non-perforated metal tube 14. The plasma discharge tube 12 extends longitudinally through the metal tube 14 from one open end 24 to the other open end 26. The plasma discharge tube 12 has a glass envelope 16 with a first and second end portions 17 and 18 projecting outward from opposite ends of the metal tube 14. Two electrical leads 20 pass through the glass envelope 16 at the first end portion 17 and connect to an electrode 21 within the plasma discharge tube. The glass tube 12 contains an ionizable gas, such as neon and/or argon. When a high voltage is applied across leads 20 and the metal tube 14, the gas within the plasma discharge tube 12 is ionized, creating a plasma therewithin.

The metal tube 14 is flared outward at ends 24 and 26 providing a larger interior diameter in these sections than the interior diameter at the middle of the tube. The larger interior diameter of the metal tube ends 24 and 26 increases the spacing between the tube and the glass envelope of the plasma discharge tube 12 at those sections.

Figure 3:
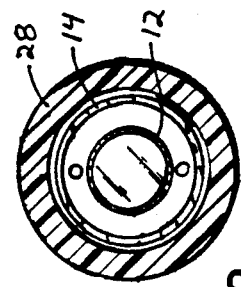
FIG. 3 is a cross-sectional view taken along line 3—3 of FIG. 1.
Figure 2:
FIG. 2 is a cross-section taken along line 2—2 of FIG. 1.

The first flared end 24 of metal tube 14 fits within a conventional polyvinyl chloride (PVC) pipe union 28, cross sections through which are shown in FIGS. 2 and 3. A snug fit exists between the metal tube and the first union 28, providing a relatively air tight seal between those components. If necessary for an enhanced seal, epoxy resin may be used to attach the first union 28 to the metal tube 14. Three slot apertures 31, 32 and 33 are cut through the wall of the union near the midpoint of its length to allow external gas, such as oxygen or air, to enter the union and flow between the two tubes 12 and 14.

A tubular PVC bushing 34 fits partially within the remote end of the first union 28 and is solvent welded thereto. The bushing has part of its interior surface 36 which necks down to a smaller internal diameter that abuts the outer surface of the glass envelope 16, thereby supporting the plasma discharge tube 14 coaxially within the metal tube 14. A PVC cap 40 is threaded over the exposed end of bushing 34 and is solvent welded thereto. The cap 40 has an aperture 42 into which the first end portion 17 of the plasma discharge tube 12 and leads 20 extend. A first annular seal 38 of an non-conductive, elastomeric material, such as rubber, is positioned around the tip of the plasma discharge tube 12 being compressed between the cap 40 and the bushing 34 providing a substantially air tight seal against the glass envelope 16. The first seal 38 also serves to prevent high voltage applied to leads 20 from tracking along the glass surface toward the first end 24 of the metal tube 14. Components 28, 34, 38 and 40 form a first end cap assembly 30.

A second end cap assembly 44 is located at the opposite end of the ozone generator 10. This assembly 44 is formed by a second PVC pipe union 46 within which the second end 26 of the metal tube partially projects. As with the first end 24, the flared second end 26 engages the interior surface of the second union 46, providing a relatively air tight seal. A second annular support 48 of non-conductive, elastomeric material is held within the second union 46 between the end of metal tube 14 and an interior circumferential boss 49 of the union. A tip of glass tube second end portion 18 fits within a central aperture 50 in the second support 48. Additional apertures 52 extend through the second seal providing passages for gas to flow from within the metal tube 14 into remote portions of the second union 46. A conventional PVC threaded pipe adaptor 54 is solvent welded within the remote end of the second union 46 to provide a connection for an ozone collection system. The first and second end cap assemblies 30 and 44 provide a means for accurately maintaining the plasma discharge tube 12 coaxially within the metal tube 14 with a uniform spacing between the tubes.

During the operation of the present ozone generator, oxygen gas is forced to flow between the tubes 12 and 14. The gas enters an inlet passage formed by apertures 31-33 and flows along the glass tube 12 into the metal tube 14. An excitation voltage is applied from a source (not shown) to the electrode 21 via leads 20 ionizing the gas within the glass tube 12 and creating a plasma discharge. The plasma acts as a conductor of positive potential. The metal tube is coupled to ground thereby establishing a relatively high voltage between the two tubes 12 and 14. This voltage difference creates a corona in the gap between the tubes.

The oxygen flows through the corona and is ionized into ozone. The ozone enriched gas travels out of the metal tube at the second open end 26 and through apertures 52 in the second support 48. From there the gas passes out of the generator 10 via the pipe adaptor 54.

The present tubular ozone generator 10 offers several advantages over previous designs. The longitudinal flow of the gas along the tubes does not require perforations in the metal tube 14, thus simplifying its manufacture. The flared ends of the metal tube significantly reduce the likelihood that an arc discharge will occur between the sharp edges of those ends and the glass plasma discharge tube. The end cap assemblies 30 and 44 maintain tubes 12 and 14 in a uniform coaxial relationship minimizing regions of intense corona activity which adversely affect the glass envelope 16. The end caps assemblies 30 and 44 are fabricated from commonly available PVC pipe fitting and elastomeric seals further reducing the manufacturing costs.

We claim:

1. An ozone generator comprising:
    a metal tube having open first and second ends formed by outwardly flared sections of the metal tube;
    a closed glass tube positioned substantially coaxial within said metal tube and extending outward from the first end thereof, said glass tube containing an ionizable gas and an electrode means for exciting the gas to generate a plasma discharge within said glass tube which creates a corona between said glass and said metal tubes;
    a first end cap assembly within which the first end of said metal tube and a first portion of said glass tube extend and are fixedly attached thereto, and having a first aperture through which gas can flow; and
    a second end cap assembly within which the second end of said metal tube and a second portion of said glass tube extend and are fixedly attached thereto, and having a second aperture through which gas can flow wherein a gas to be treated flows between and adjacent to said glass tube and said metal tubes;

2. The ozone generator as recited in claim 1 wherein said first end cap assembly comprises:
    a tubular union with one region within which the first end of said metal tube is located and the first aperture of the assembly located through a wall of said union; and
    a bushing fixedly mounted within another region of said union and having a inner surface that abuts the first portion of said glass tube.

3. The ozone generator as recited in claim 2 wherein said bushing has an opening through which the first portion of the glass tube extends; and further comprising a means for providing a substantially air-tight seal between said glass tube and said bushing.

4. The ozone generator as recited in claim 1 wherein said first end cap assembly comprises;
    a tubular member with a region coupled to the first section of said metal tube; and
    a means located in another region of said member for supporting the first portion of said glass tube within said member.

5. The ozone generator as recited in claim 1 wherein said second end cap assembly comprises:
    a tubular member coupled to the second section said metal tube, and having the second aperture therein; and
    a means for supporting the second portion of said glass tube within said member.

6. The ozone generator as recited in claim 5 wherein said tubular member further includes a means for connecting an ozone collection system to receive gas flowing through the second aperture.

7. An ozone generator comprising:
    a non-perforated metal tube having first and second open opposite ends;
    a closed glass tube containing an ionizable gas and an electrode, and located substantially coaxial within said metal tube and extending outward from each end thereof, said glass tube for generating a plasma discharge therein which creates a corona between said glass tube and said metal tube;
    a first tubular member having an end region attached to the first end of said metal tube, and having a gas passage formed therein;
    a first means, coupled to said first tubular member, for supporting one end of said glass tube;
    a second tubular member having an end region attached to the second end of said metal tube, and having another gas passage formed therein; and
    a second means, coupled to said second tubular member, for supporting another end of said glass tube wherein a gas to be treated flows between and adjacent to said glass tube and said metal tube.

8. The ozone generator as recited in claim 7 wherein the first and second ends of said metal tube are formed by separate outwardly flared tube sections.

9. The ozone generator as recited in claim 7 wherein said first means for supporting one end of said glass tube comprises:
    a tubular bushing into which the glass tube extends, and having one end attached within said first tubular member;
    a cap extending over another end of said bushing; and
    an annular seal held between said cap and said bushing, and having an opening in which a portion of said glass tube is located.

10. The ozone generator as recited in claim 9 wherein said bushing has an interior opening that reduces in cross-sectional size so that an inner surface of said bushing contacts said glass tube.

11. The ozone generator as recited in claim 7 wherein said second means for supporting another end of said glass tube comprises a support held between the second end of said metal tube and a boss extending from an inner surface of said second tubular member, said glass tube being held in a fixed position by said support.

12. The ozone generator as recited in claim 11 wherein said support has a annular shape with said glass tube being held within an opening in said support.

* * * * *